US006021636A

United States Patent [19]
Johnson et al.

[11] Patent Number: 6,021,636
[45] Date of Patent: Feb. 8, 2000

[54] LIGHTWEIGHT TERTIARY THRUST REVERSER LOCK ASSEMBLY WITH A BLOCKING MEMBER

[75] Inventors: Andrew T. Johnson, Scottsdale; Donald I. Takeuchi; Kevin Chakkera, both of Tempe, all of Ariz.

[73] Assignee: AlliedSignal Inc., Morristown, N.J.

[21] Appl. No.: 08/901,057

[22] Filed: Jul. 25, 1997

[51] Int. Cl.[7] ...................................................... F02K 3/02
[52] U.S. Cl. ........................ 60/226.2; 60/230; 244/110 B
[58] Field of Search .................................. 60/226.2, 230; 244/110 B; 239/265.27, 265.29, 265.31

[56] References Cited

U.S. PATENT DOCUMENTS

| | | |
|---|---|---|
| 4,424,669 | 1/1984 | Fage .......................................... 60/230 |
| 4,437,783 | 3/1984 | Halin et al. . |
| 4,754,694 | 7/1988 | Martin ........................................ 92/5 L |
| 4,827,248 | 5/1989 | Crudden et al. ..................... 244/110 B |
| 5,224,342 | 7/1993 | Lair ............................................ 60/230 |
| 5,257,840 | 11/1993 | Rouzaud .................................. 292/201 |
| 5,267,760 | 12/1993 | Carlin . |
| 5,280,704 | 1/1994 | Anderson et al. . |
| 5,404,714 | 4/1995 | Davies . |
| 5,448,884 | 9/1995 | Repp . |
| 5,547,130 | 8/1996 | Davies . |
| 5,735,557 | 4/1998 | Harvey ................................... 60/226.2 |

*Primary Examiner*—Charles G. Freay
*Assistant Examiner*—Ted Kim
*Attorney, Agent, or Firm*—William J. Zak, Jr.

[57] ABSTRACT

An aircraft thrust reverser mechanism comprises a thrust reverser moveable between a deployed position in which at least a portion of gas flowing through the aircraft engine is redirected in a non-rearward direction and a stowed position in which gas flowing through the engine is not redirected. A thrust reverser lock is provided to prevent inadvertent deployment of the thrust reverser. The thrust reverser lock comprises a locking element rotatable about a pivot between a closed position in which the locking element prevents deployment of the thrust reverser and an open position in which the locking element permits the thrust reverser to be deployed. A retractable blocking element prevents the locking element from moving to the second position unless the blocking element is first withdrawn. The locking element is shaped in such a way that if the thrust reverser moves toward a deployed position without the blocking element having first been withdrawn, the force produced by the contact between the thrust reverser and the locking element produces a torque that tends to move the lock into its closed position.

10 Claims, 6 Drawing Sheets

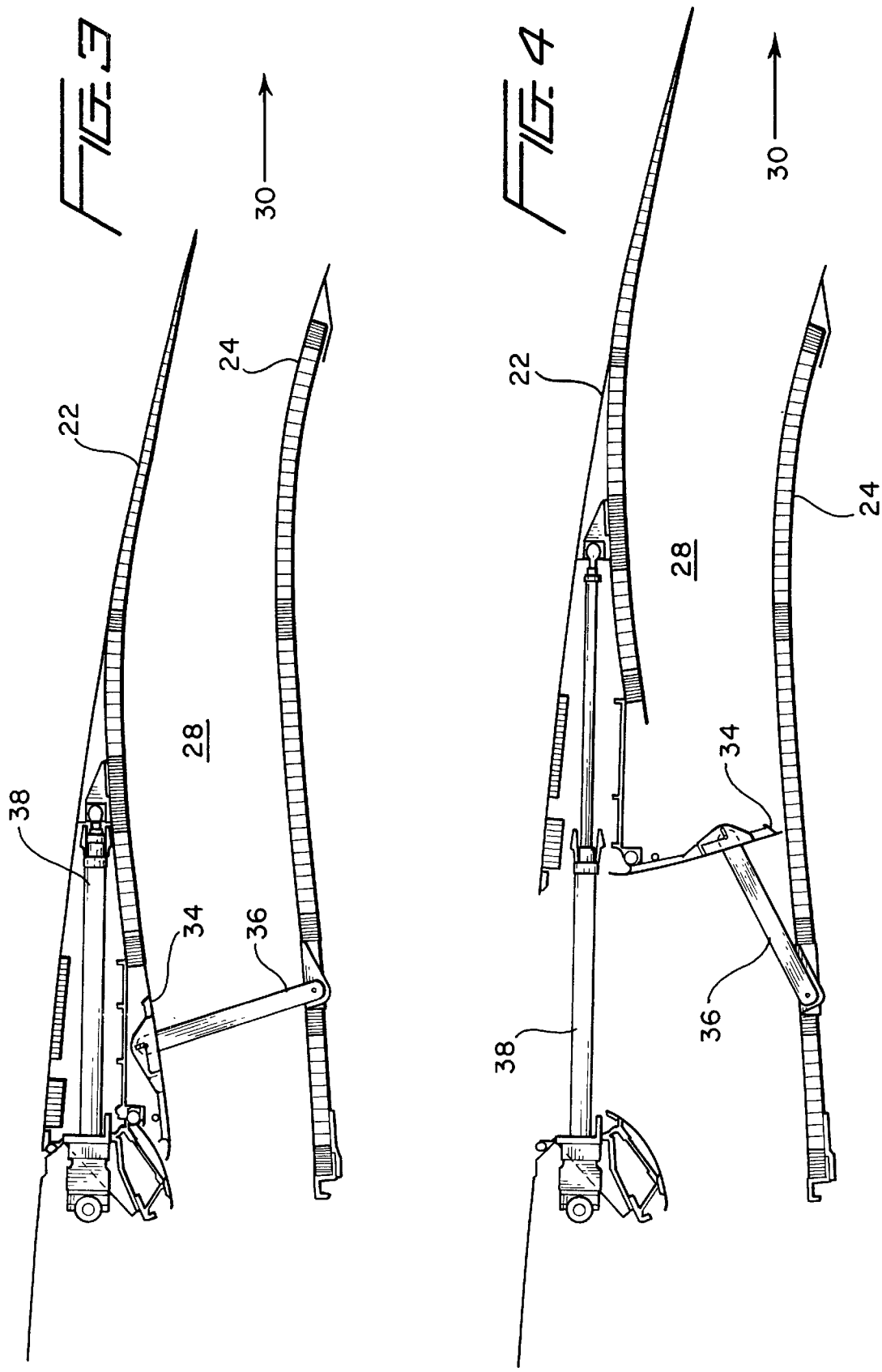

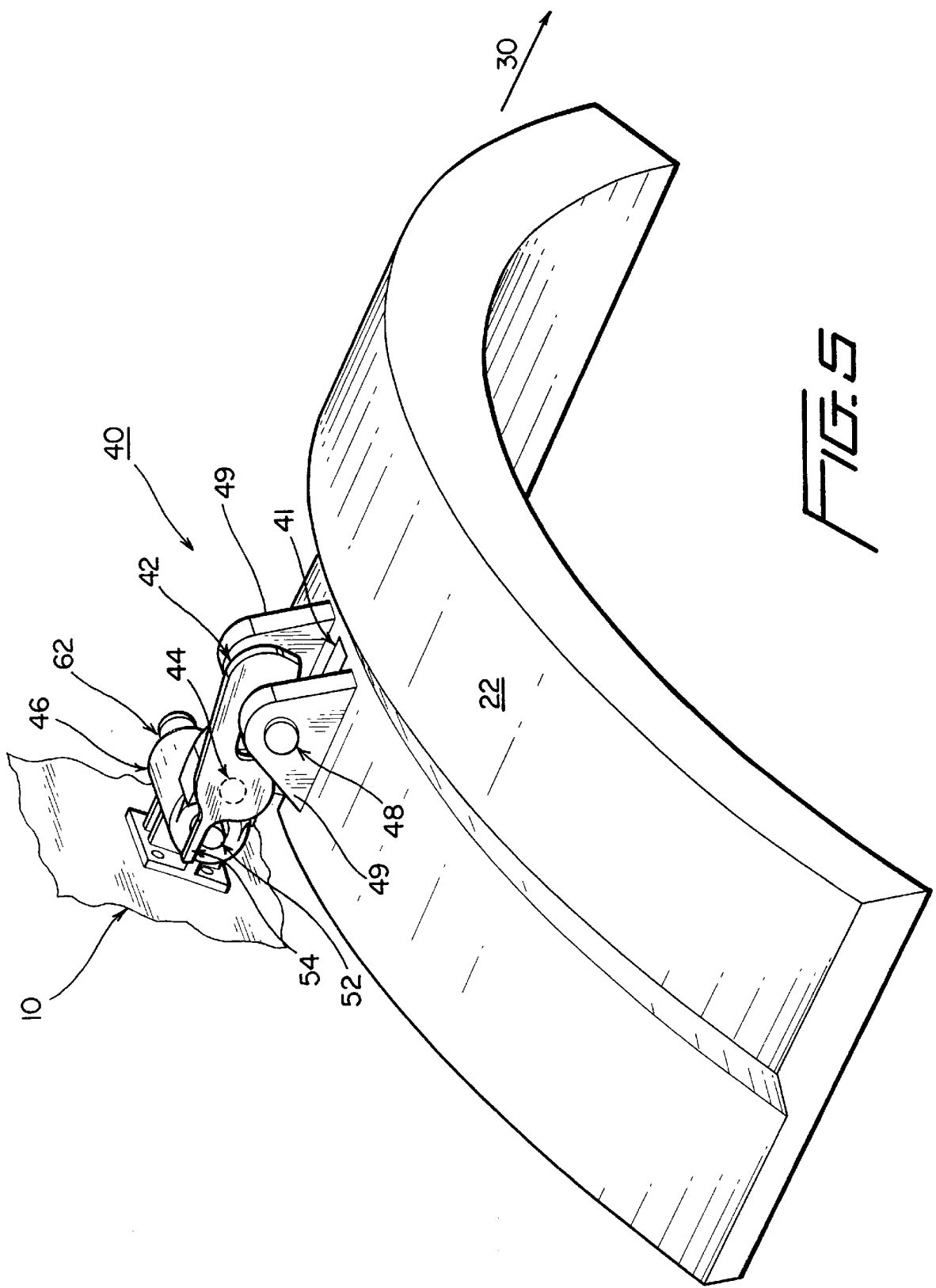

LIGHTWEIGHT TERTIARY THRUST REVERSER LOCK ASSEMBLY WITH A BLOCKING MEMBER

BACKGROUND OF THE INVENTION

The present invention relates to jet aircraft engines, in particular to a thrust reverser mechanism for a jet aircraft engine.

A jet engine thrust reverser operates to redirect either engine exhaust gases or engine fan air in a lateral and forward direction. Thrust reverser operation is typically initiated by the pilot of the aircraft once the aircraft has touched down on the runway. The exhaust gases or engine fan air redirected by the thrust reverser cause a rearward net thrust of the aircraft engine to aid in slowing an airplane during landing rollout. In a typical high bypass jet engine, redirection of the air is accomplished by a plurality of blocker doors and reversing vanes operating in conjunction with a moveable transcowl. The blocker doors move into the stream of bypass air to redirect the air through the reversing vanes, which are simultaneously uncovered by the moveable transcowl to permit the redirected air to escape in a lateral and forward direction around the periphery of the engine nacelle.

Multiple redundant locks are typically employed to prevent an inadvertent deployment of the thrust reverser transcowl. The primary locks typically comprise mechanical locks on the actuators that move the transcowl. Pressure to the actuators cause the primary locks to be released to permit the transcowl to move. Secondary and tertiary thrust reverser locks typically comprise hydraulic, pnuematic or electrically actuated locks acting on the actuators, the actuator synchronization shaft, or directly on the moveable transcowl. A prior art thrust reverser lock that mechanically locks the transcowl to the engine nacelle is disclosed in U.S. Pat. No. 5,404,714 to Davies. The prior art lock comprises a rotatable jaw that engages a locking pin of the moveable thrust reversing member. The rotatable jaw is locked in position by a removable slide that wedges between the rotatable jaw and an anvil to prevent rotation of the jaw. When the prior art lock prevents an inadvertent deployment of the thrust reverser, the slide must bear the entire force of the thrust reverser locking pin. Accordingly, the slide must be of robust construction, with commensurate weight and cost.

SUMMARY OF THE INVENTION

In accordance with the present invention an aircraft thrust reverser mechanism comprises a thrust reverser moveable between a deployed position in which at least a portion of gas flowing through the aircraft engine is redirected in a non-rearward direction and a stowed position in which gas flowing through the engine is not redirected. A thrust reverser lock is provided to prevent inadvertent deployment of the thrust reverser. The thrust reverser lock comprises a locking element rotatable about a pivot between a first position in which the locking element prevents deployment of the thrust reverser and a second position in which the locking element permits the thrust reverser to be deployed. A retractable blocking element prevents the locking element from moving to the second position unless the blocking element is first withdrawn. The locking element is shaped in such a way that if the thrust reverser moves toward a deployed position without the blocking element having first been withdrawn, the force produced by the contact between the thrust reverser and the locking element produces either no torque about the locking element, or produces a torque that tends to rotate the locking element to more fully engage the thrust reverser. In either case, no additional force is applied to the blocking element.

According to one embodiment, the blocking element comprises an extension of the armature of a solenoid. The blocking element is spring loaded into the blocking position and is retracted by energizing the solenoid in response to the command of the pilot. Additionally, a sensor may be incorporated into the thrust reverser lock to sense the position of the blocking element independent of the state of energization of the solenoid.

BRIEF DESCRIPTION OF THE DRAWING

The present invention will be better understood from a reading of the following detailed description, taken in conjunction with the accompanying drawing figures in which like references designate like elements and, in which:

FIG. 3 is a cross sectional view of an engine thrust reverser to which the invention may advantageously be applied with the thrust reverser in the stowed position;

FIG. 4 is a cross sectional view of an engine thrust reverser to which the invention may advantageously be applied with the thrust reverser in the deployed position;

FIG. 5 is a perspective view of a thrust reverser lock incorporating features of the present invention;

DETAILED DESCRIPTION

Figure 1:
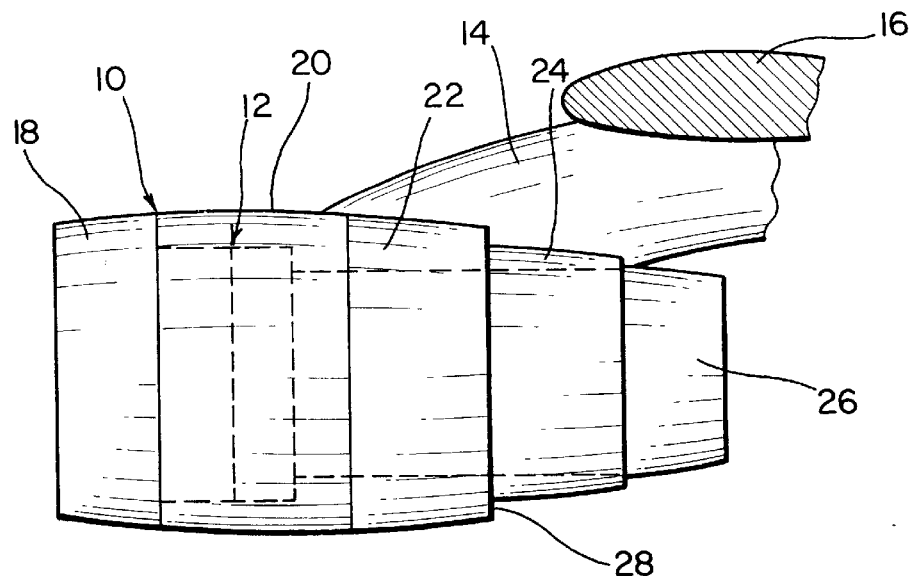
FIG. 1 is a side view of a conventional aircraft engine nacelle and strut.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows a conventional aircraft nacelle 10, which includes a jet engine 12, supported by a strut 14 suspended from a wing 16, which is shown in cross section. The nacelle 10 includes a nose cowl 18, a fan cowl 20, a translating thrust reverser cowl, hereinafter referred to as a transcowl 22, a core cowl 24, and exhaust nozzle 26. During normal operation, engine fan air is driven at high speed through the annular region 28 between the transcowl 22 and the core cowl 24. The fan air exits the annular flow path near the exhaust nozzle 26 where it joins the jet engine exhaust gases to produce a combined thrust.

Figure 2:
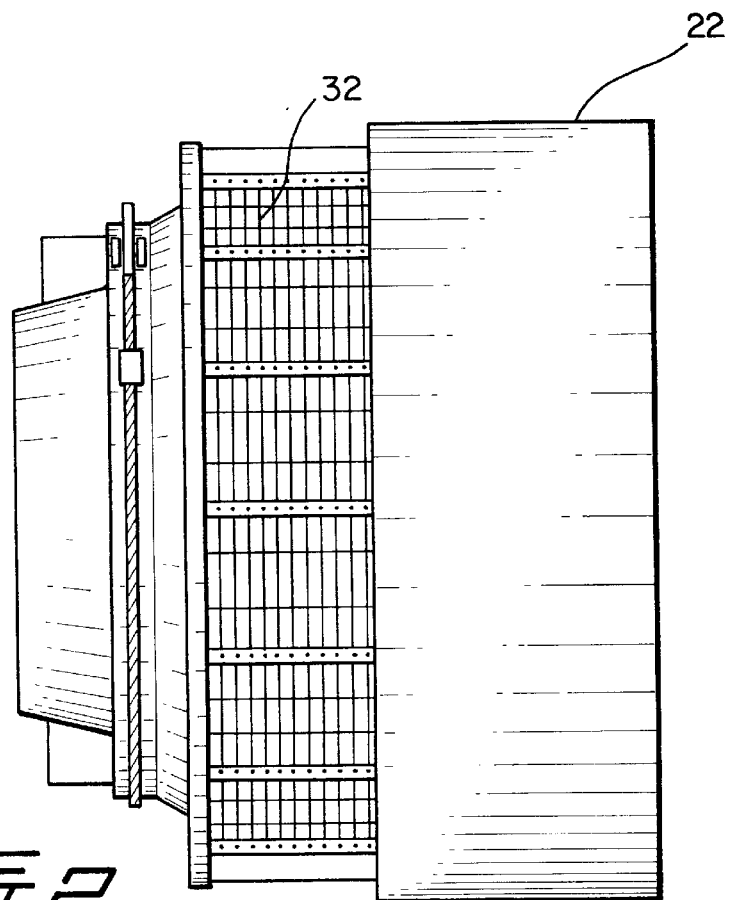
FIG. 2 is a side view of a conventional thrust reverser system.

With reference to FIG. 2, in response to a signal to deploy the thrust reverser, transcowl 22 moves in a rearward direction indicated by arrow 30 from a stowed position to a deployed position. As the transcowl 22 moves rearward, a plurality of reversing vanes 32 are uncovered to the airstream flowing around the engine nacelle. Reversing vanes 32 are canted forward so that air directed into the vanes is redirected forward to product a rearward thrust.

With reference to FIGS. 3 and 4, movement of the transcowl is typically effected by a plurality of actuators 38, which extend to move the transcowl 22 rearward to its deployed position and retract to move the transcowl 22 to its stowed position. Movement of transcowl 22 rearward causes a series of blocker doors 34 to be pivoted by a series of rigid links 36 and to move into the airstream flowing in the annular region 28 between the core cowl 24 and the transcowl 22. As blocker doors 34 move into the airstream, they redirect the air laterally into reversing vanes 32. In jet engines not equipped with reversing vanes 32, the position of blocker doors 34 effects both the blocking and lateral/forward redirection of the fan air.

FIG. 5 shows a portion of transcowl 22 together with a thrust reverser lock 40 incorporating features of the present invention. Thrust reverser lock 40 comprises locking element 42 which is generally hook-shaped and pivoted about pivot shaft 44, which is supported by housing 46. Housing 46, in turn, is secured to engine nacelle 10. Locking pin 48 is attached to transcowl 22 by support flanges 49. The attachment of locking pin 48 to support flanges 49 may be rigid or rotatable, such as with sleeve or ball bearings well known in the art. Locking pin 48 and locking element 42 cooperate to prevent transcowl 22 from moving relative to nacelle 10 unless locking element 42 is disengaged from locking pin 48 as described more fully below.

Figure 7:
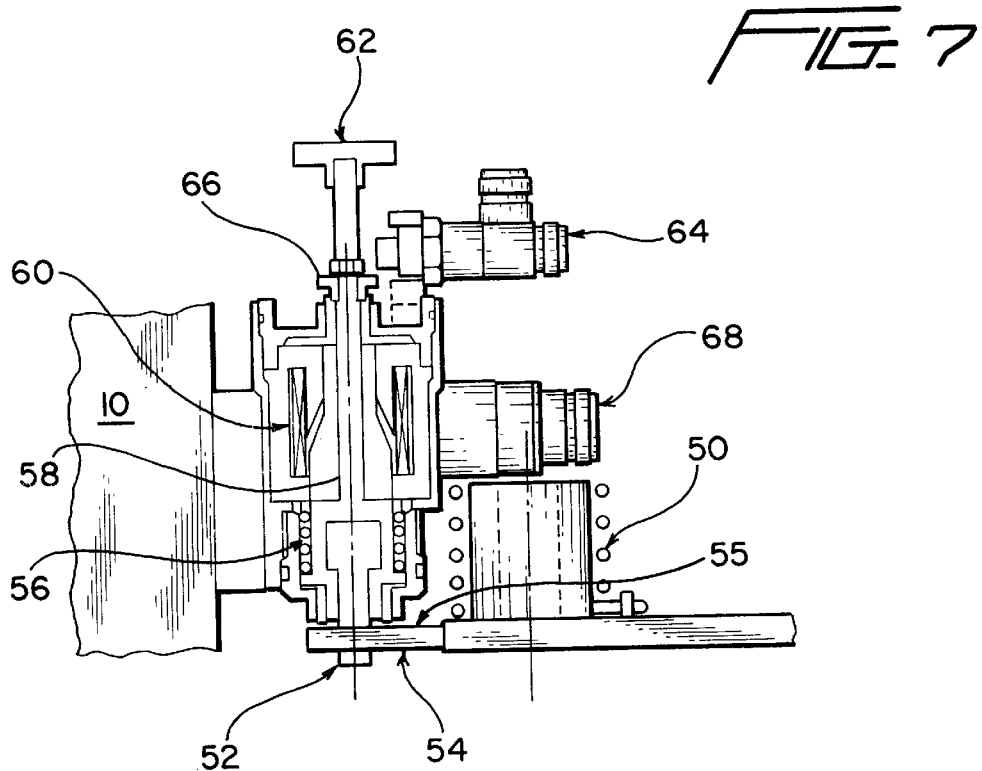
FIG. 7 is a top view of the thrust reverser lock of FIG. 5.
Figure 6:
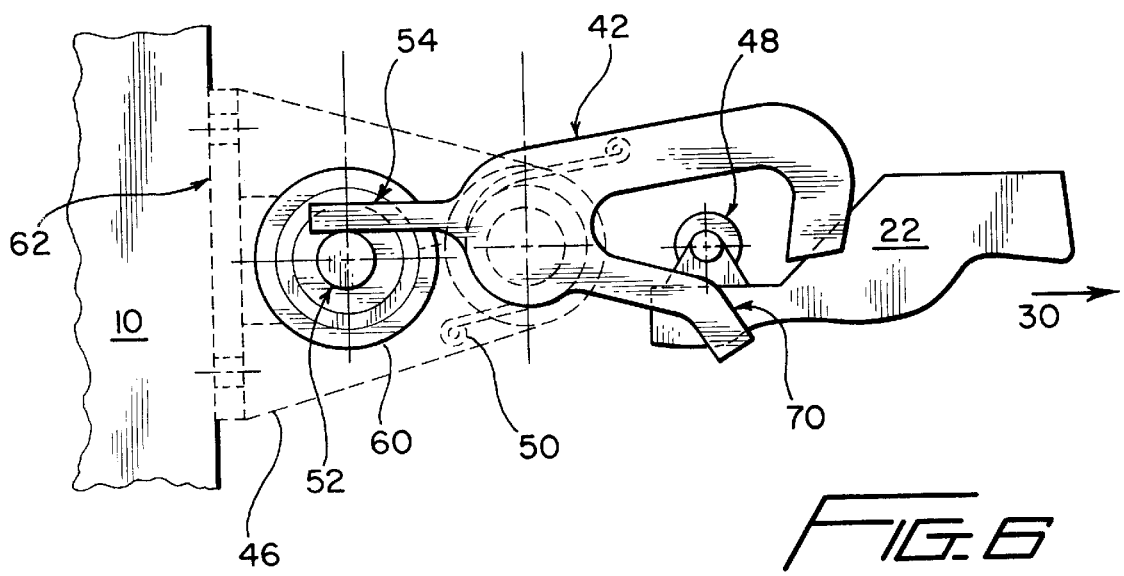
FIG. 6 is a side view of the thrust reverser lock of FIG. 5.

With reference to FIGS. 6 and 7, a resilient member, which in the illustrative embodiment is a torsional spring 50 imparts a torque on locking element 42 to urge it into the disengaged position up and away from locking pin 48. Locking element 42 is held in the closed position due to the contact between locking pin 48 and the lower cam surface 70 of locking element 42. Blocking element 52 is moveable between a retracted position and an extended, blocking position. With blocking element in the extended position, if locking pin 48 begins to move away from engagement with surface 70, blocking element engages an extension 54 of locking element 42, which prevents locking element 42 from moving out of the closed position. A slot 41 may be provided in transcowl 22 to provide clearance for the moveable locking element 42. Spring 50 in the illustrative embodiment is shown as a torsional spring, however, a linear spring, such as a compression spring (not shown) supported by housing 46 and urging the upper surface of extension 54 downward, or other linear spring arrangements well known in the art could be employed to urge locking element 42 toward the open position.

Blocking element 52 may comprise an extension of the ram of a conventional hydraulic actuator, lead screw or, preferably an extension of the armature 58 of a conventional solenoid 60. As shown most clearly in FIG.7, blocking element 52 is urged by a linear spring 56 into the extended position in which it passes underneath extension 54, thereby preventing rotation of locking element 42 into the open position. Blocking element 52 is retracted from the blocking position into the retracted position by energizing solenoid 60 or, in a maintenance setting, by pulling on manual release handle 62. With blocking element 52 in the retracted position, extension 54 is able to rotate past blocking element 52, thereby allowing locking element 42 to rotate into the open position. A proximity sensor 64 senses the presence or absence of an enlarged diameter region 66 of armature 58 to provide a signal indicative of the position of blocking element 52. The signal generated by proximity sensor 64 is a direct indication of the position of blocking element 52, which is a more reliable indicator than merely determining the state of energization of the retraction solenoid as found in some prior art thrust reverser lock mechanisms. Proximity sensor 64 may be any one of a number of commercially available proximity sensors or may be a conventional proximity switch. A conventional connector 68 well known in the art is used to provide electrical connections between the aircraft electrical system and the thrust reverser lock proximity sensor and solenoid.

Figure 8:
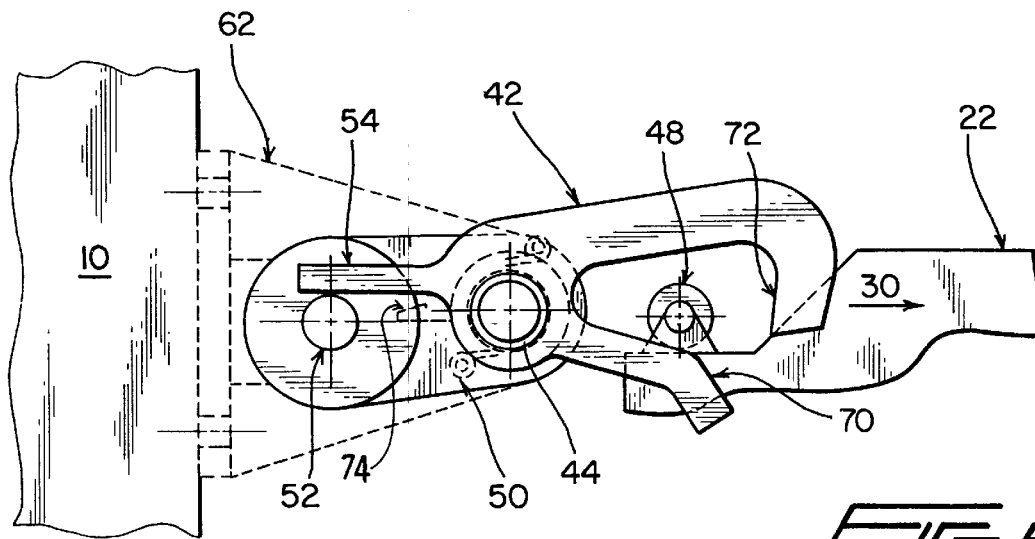
FIG. 8 is a side view of the thrust reverser lock of FIG. 5 depicting a normal stowed position.
Figure 9:
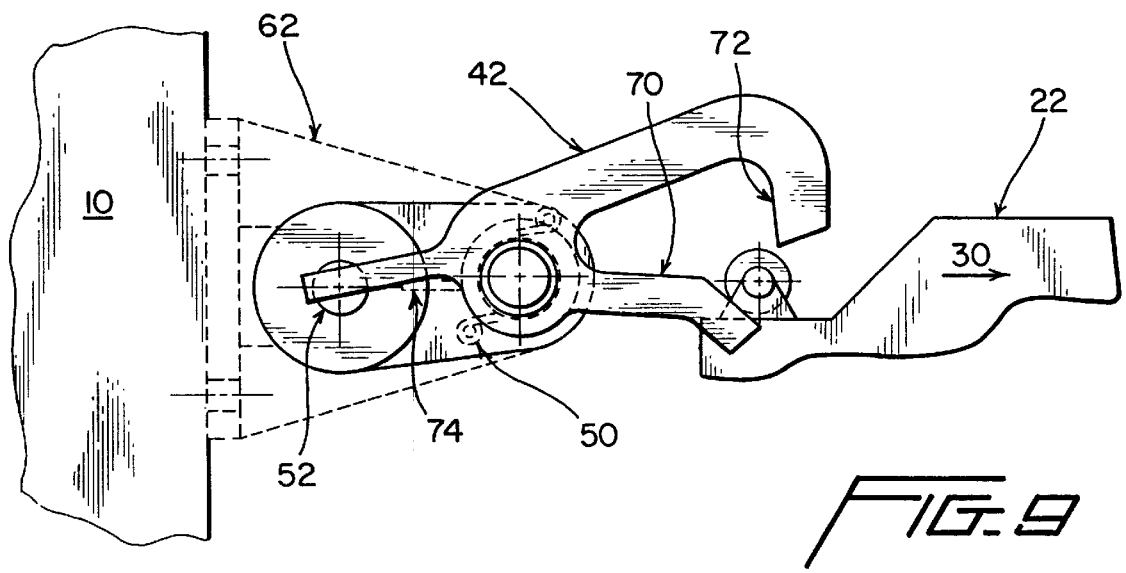
FIG. 9 is a side view of the thrust reverser lock of FIG. 5 depicting a normal deploy position.

FIGS. 8, and 9 depict a normal deployment sequence of the engine thrust reverser. FIG. 8 depicts the normal stowed position of transcowl 22. Locking element 42, which rotates about pivot shaft 44 is urged by spring 50 toward the open position (counter clockwise as shown in FIG. 8). Locking element 42 is maintained in the closed position as shown in FIG. 8 by the contact between locking pin 48 attached to the transcowl 22 and cam surface 70 of the locking element 42. In the stowed position of transcowl 22, blocking element 52 is extended, so that if locking element 42 begins to rotate into the open position, the progress of locking element 42 will be impeded by the interference between blocking element 52 and extension 54 of locking element 42.

As the normal deploy sequence of transcowl 22 is initiated, blocking element 52 is retracted into the retracted position, however, locking element 42 remains in the closed position due to the contact between locking pin 48 and cam surface 70 of locking element 42. As transcowl 22 moves rearward 30 toward a deployed position, locking element 42 is urged by spring 50 toward an open position as locking pin 48 rides along cam surface 70 of locking element 42. Locking element 42 continues to rotate toward the open position until it comes into contact with a projection 74, which extends from housing 62 to act as a stop to prevent locking element 42 from rotating past the fully open position shown in FIG. 9. Once locking element 42 reaches the fully open position, locking pin 48 disengages from cam surface 70 as transcowl 22 moves to the fully deployed position.

In the normal stow sequence, the events are reversed. As transcowl 22 moves toward the stowed position, locking pin 48 engages cam surface 70 of locking element 42 to move locking element 42 into the closed position counteracting the urging of spring 50. As transcowl 42 approaches the fully stowed position, extension 54 clears the end of blocking member 52. Solenoid 60 is then de-energized to permit linear spring 56 to move blocking member 52 into the extended position.

With locking element 42 in the fully open position as limited by projection 74, extension 54 of locking element 42 does not move completely past blocking element 52. Accordingly, if solenoid 60 were to be de-energized while the thrust reversers were deployed, blocking element 52 would be urged incrementally forward by linear spring 56 until blocking element came to rest against the rear surface 55 (shown in FIG. 7) of extension 54. The incremental movement of blocking element 52 could cause the signal from proximity sensor 64 to change, thereby alerting the pilot and/or maintenance personnel that a solenoid failure had occurred. However, because extension 54 does not move completely past blocking element 52 blocking element 52 would not prevent the transcowl from moving into the stowed and locked position. Instead, as transcowl 22 returned to the stowed position and locking pin 48 engaged cam surface 70, blocking element 52 would ride along rear surface 55 of extension 54 until transcowl 22 reached the stowed position and locking element 42 returned to the closed position, whereupon blocking element 52, now clear of rear surface 55, would return to the extended position as urged by linear spring 56.

Figure 10:
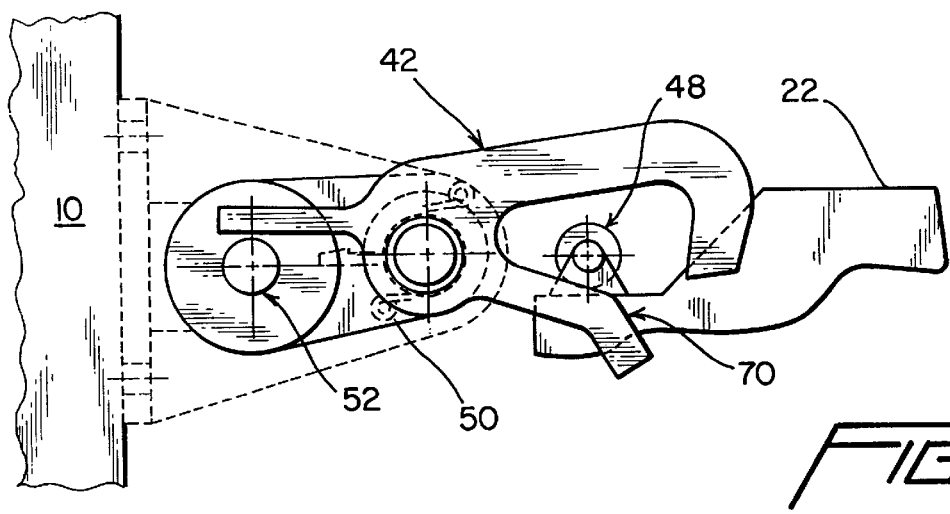
FIG. 10 is a side view of the thrust reverser lock of FIG. 5 depicting prevention of an inadvertent deploy.
Figure 11:
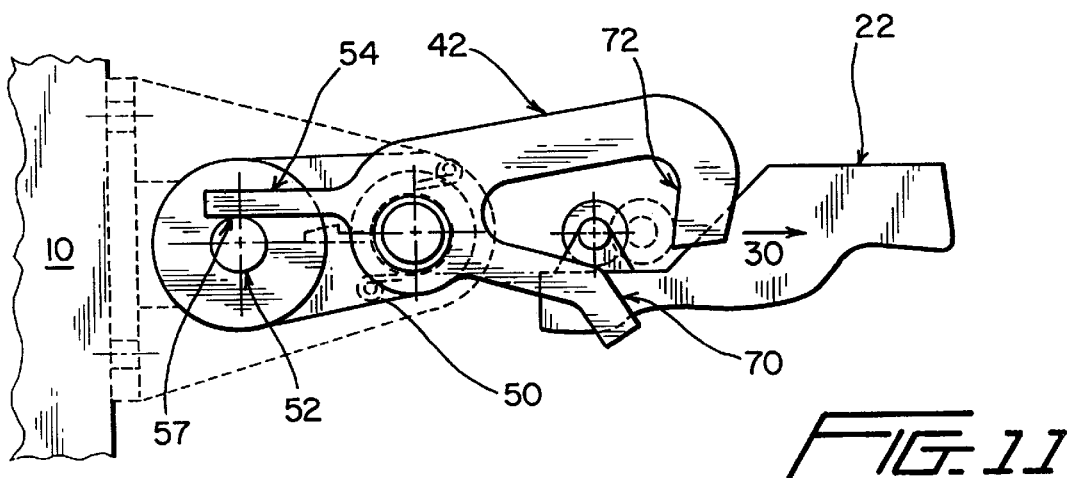
FIG. 11 is a side view of the thrust reverser lock of FIG. 5 depicting prevention of an inadvertent deploy.
Figure 12:
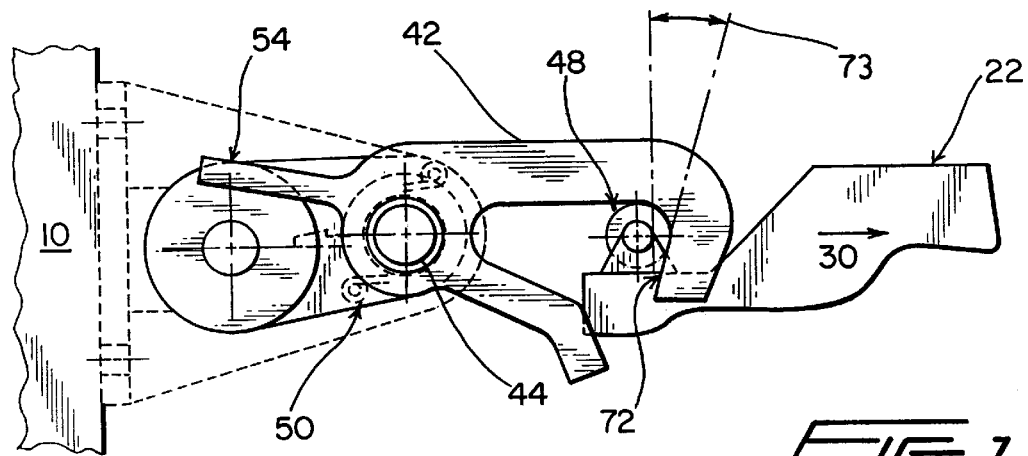
FIG. 12 is a side view of the thrust reverser lock of FIG. 5 depicting prevention of an inadvertent deploy.

FIGS. 10–12 depict the sequence of events when an inadvertent deployment of the thrust reverser mechanism is prevented. FIG. 10 again depicts the normal stowed position of transcowl 22 in which locking element 42 is urged by spring 50 toward the open position but is maintained in the closed position by the contact between locking pin 48 and cam surface 70 of the locking element 42. Blocking element 52 is in the extended position as urged by linear spring 56.

If the primary locks are accidentally unlocked, for example due to a fault in the hydraulic control lines, no electrical signal will be transmitted to solenoid 60. Accordingly, blocking element 52 will remain in the extended position. As shown in FIG. 11, as the transcowl 22 moves rearward toward the deployed position as indicated by arrow 30, locking element 42 is urged by spring 50 toward an open position as locking pin 48 rides along cam surface 70 of locking element 42. However, since blocking element 52 is in the extended position, extension 54 of locking element 42 comes to rest against the extended end of blocking element 52 at contact point 57. The contact between extension 54 and the extended end of blocking element 52 arrests any further motion of locking element 42 toward the open position. With the motion of locking element 42 arrested, locking pin 48 is unable to clear the pin engagement surface 72 of locking element 42. Accordingly, further motion of transcowl 22 toward the deployed position is prevented and the inadvertent deployment is prevented.

Pin engagement surface 72 is preferably disposed at an angle 73, preferably between 0 and 20 degrees, most preferably about 12 degrees measured normal to the direction of motion of locking pin 48, but in any event at an angle such that when locking pin 48 strikes pin engagement surface 72, either no torque is developed about pivot 44 or if a torque is developed, the torque is in a direction that rotates locking element toward the closed position. Thus, no load is imposed on blocking element 52 beyond that initially exerted by spring 50.

As can be appreciated from the foregoing discussion, the entire load of the locking pin 48 is reacted by the locking member 42 and its pivot 44. Since no load is transmitted to the blocking element 52, the blocking element 52, solenoid 60, linear spring 56 and other associated components can be reduced in size and weight without sacrificing reliability. Additionally, because blocking element 52 does not engage the extension 54 of locking element 42, except briefly during the prevention of an inadvertent deploy, wear on these parts is negligible.

Accordingly, the lock mechanism of the present invention is not only lighter, but also more reliable than prior art thrust reverser locks. Although certain preferred embodiments and methods have been disclosed herein, it will be apparent from the foregoing disclosure to those skilled in the art that variations and modifications of such embodiments and methods may be made without departing from the spirit and scope of the invention. For example, although the illustrative embodiment depicts use of a cascade thrust reverser system to divert bypass air, the principles of the present invention could be applied equally to a system incorporating blocker doors that deflect the jet engine exhaust. Accordingly, it is intended that the invention shall be limited only to the extent required by the appended claims and the rules and principles of applicable law.

What is claimed is:

1. A locking mechanism for use with an engine thrust reverser moveable between a stowed position and a deployed position, said locking mechanism comprising:

a pivot;

a resilient member;

a locking element rotatable about said pivot between a first position for preventing deployment of a thrust reversing member and a second position for allowing deployment of said thrust reversing member, said locking element urged by said resilient member toward said second position;

said locking element comprising a first surface adapted to engage a locking pin on said thrust reversing member for rotating said locking element from said second position to said first position when said thrust reversing member moves from said deployed position to said stowed position;

a blocking member moveable between a blocking position and a retracted position, wherein said blocking position prevents rotation of said locking element from said first position to said second position;

means for selectively moving said blocking member away from said blocking position;

said locking element further including a second surface adapted to engage said locking pin when said thrust reversing member moves from said stowed position toward said deployed position and when said blocking member prevents said locking element from being urged from said first position to said second position, said second surface being inclined such that engagement of said second surface with said locking pin prevents said thrust reversing member from being deployed while producing no force at said blocking member.

2. The locking mechanism of claim 1, wherein:
said second surface is inclined such that engagement between said second surface and said locking pin produces no torque about said pivot.

3. The locking mechanism of claim 1, wherein:
said second surface is inclined such that engagement between said second surface and said locking pin produces a torque about said pivot in a direction urging said locking element toward said first position, thereby more fully engaging said locking element with said thrust reversing member.

4. The locking mechanism of claim 1, wherein:
said resilient member comprises a spring.

5. The locking mechanism of claim 4, wherein:
said spring comprises a torsional spring.

6. The locking mechanism of claim 1, wherein:
said means for selectively moving said blocking member away from said blocking position comprises a solenoid.

7. The locking mechanism of claim 1, wherein:
said means for selectively moving said blocking member away from said blocking position comprises a hydraulic actuator.

8. The locking mechanism of claim 7, wherein:
said sensor comprises a proximity switch for producing a first signal when said blocking member is in a blocking position and producing a second signal when said blocking member is withdrawn from said blocking position.

9. The locking mechanism of claim 1, further comprising:
a sensor for determining the position of said blocking member.

10. An airplane thrust reverser system for use in a jet engine comprising:

a transcowl moveable between a deployed position in which at least a portion of gas flowing through said jet engine is redirected in a non-rearward direction and a stowed position in which gas flowing through said jet engine is not redirected;

a thrust reverser lock, said thrust reverser lock comprising:

a pivot;

a locking element rotatable about said pivot between a first position for preventing deployment of a thrust reversing member and a second position for allowing deployment of said thrust reversing member;

a resilient member for urging said locking element toward said second position, said locking element having a first surface comprising a cam adapted to engage a locking pin on said thrust reversing member for rotating said locking element from said second position to said first position when said thrust reversing member moves from a deployed position to a stowed position;

a blocking member moveable between a blocking position and a retracted position, wherein said blocking position prevents rotation of said locking element from said first position to said second position;

means for selectively moving said blocking member away from said blocking position;

said locking element further including a second surface adapted to engage said locking pin when said thrust reversing member moves from said stowed position toward said deployed position and when said blocking member prevents said locking element from being urged from said first position to said second position, said second surface being inclined such that engagement of said second surface with said locking member prevents said thrust reversing member from being deployed while producing no force at said blocking member.

* * * * *